June 22, 1954 F. Q. RAST 2,681,614

RECORDING MACHINE WITH GROUPED RECORDING ELEMENTS OPERABLE SELECTIVELY TO FORM DATA-REPRESENTATIONS

Filed Sept. 27, 1949 8 Sheets-Sheet 1

INVENTOR.
Frederick Q. Rast,
BY
Edward L. Mueller
ATTORNEY.

INVENTOR.
Frederick Q. Rast,
BY
Edward L. Mueller
ATTORNEY.

RECORDING MACHINE WITH GROUPED RECORDING ELEMENTS OPERABLE SELECTIVELY TO FORM DATA-REPRESENTATIONS
Filed Sept. 27, 1949

INVENTOR.
Frederick Q. Rast,
BY
Edward L. Mueller
ATTORNEY.

INVENTOR.
Frederick Q. Rast,
BY
Edward L. Mueller
ATTORNEY.

INVENTOR.
Frederick Q. Rast,
BY
Edward L. Mueller
ATTORNEY.

June 22, 1954 F. Q. RAST 2,681,614

RECORDING MACHINE WITH GROUPED RECORDING ELEMENTS OPERABLE SELECTIVELY TO FORM DATA-REPRESENTATIONS

Filed Sept. 27, 1949 8 Sheets-Sheet 6

INVENTOR.
Frederick Q. Rast,
BY
Edward L. Mueller
ATTORNEY.

June 22, 1954 F. Q. RAST 2,681,614

RECORDING MACHINE WITH GROUPED RECORDING ELEMENTS
OPERABLE SELECTIVELY TO FORM DATA-REPRESENTATIONS

Filed Sept. 27, 1949 8 Sheets-Sheet 7

INVENTOR.
*Frederick Q. Rast,*
BY
Edward L. Knoll[?]
ATTORNEY.

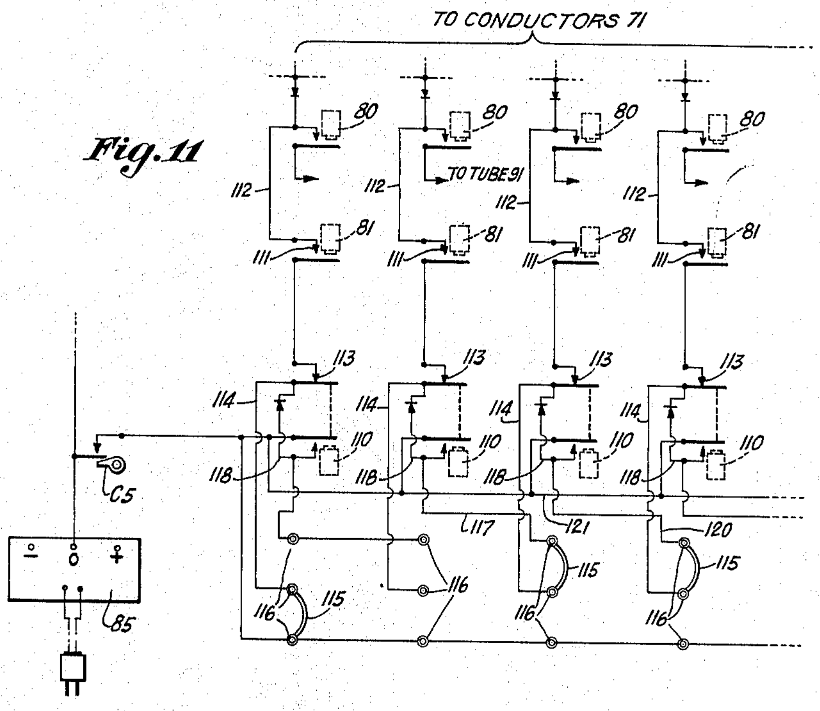
Fig. 11
Fig. 12
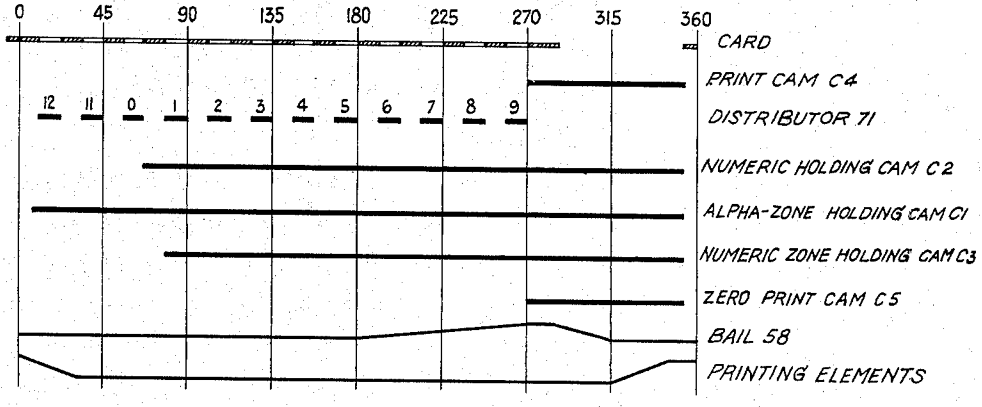
Fig. 13 Fig. 14
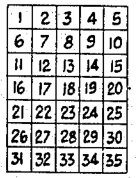
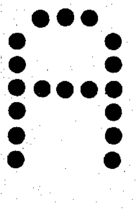
INVENTOR.
Frederick A. Rast,
BY
Edward L. Kuelle
ATTORNEY.

Patented June 22, 1954

2,681,614

UNITED STATES PATENT OFFICE 2,681,614

RECORDING MACHINE WITH GROUPED RECORDING ELEMENTS OPERABLE SELECTIVELY TO FORM DATA-REPRESENTATIONS

Frederick Q. Rast, Mamaroneck, N. Y., assignor, by mesne assignments, to Burroughs Corporation, a corporation of Michigan Application September 27, 1949, Serial No. 118,063

23 Claims. (Cl. 101—93)

This invention relates to improvements in recording machines with grouped recording elements operable selectively to form data-representations and has particular reference to a machine in which one or more print heads are employed, each comprising a multiplicity of printing elements adapted for selective operation in various combinations to form different characters.

The invention is similar to that described in the co-pending application of Herman Speh and William Wockenfuss, filed March 8, 1949, Serial No. 80,136, which discloses a machine in which each of a plurality of print heads includes a number of printing elements which, generally, are in the form of wires grouped together to form said head and are selectively operable in various combinations to form different characters. This selective operation for each print head is under the control of electromagnetic devices which, in response to impulses generated by the analysis of a record such, for example, as a tabulating card, are selectively operated to determine or identify by their operation the combination of printing elements necessary to be moved from non-print to print position in order to form any particular character. Cyclically operating means are provided for effecting the movements of the printing elements to print position in accordance with their selection and for also restoring said elements to non-print position, and said means is shown as including a spring for each printing element operable to propel the same to its print position and a reciprocating bail common to all the elements of the head for restoring said elements to their non-print position.

The present disclosure contemplates a simplified and more positive control of the movements of the printing elements to and from their print position.

The invention also embodies an arrangement of print control units and associated panels supporting the various print heads which will facilitate the assembly of the constituent parts of the machine and provide for a practical and effective drive for the operating mechanisms of the various print units whereby the same will cooperate to simultaneously control the operation of all the printing elements comprising the various print heads of the machine.

The inventive idea involved is capable of receiving a variety of expressions some of which, for purposes of illustration, are shown in the accompanying drawings; but it is to be expressly understood that said drawings are employed merely for the purpose of facilitating the description of the invention as a whole and not to define the limits thereof, reference being had to the appended claims for this purpose.

Figure 8:
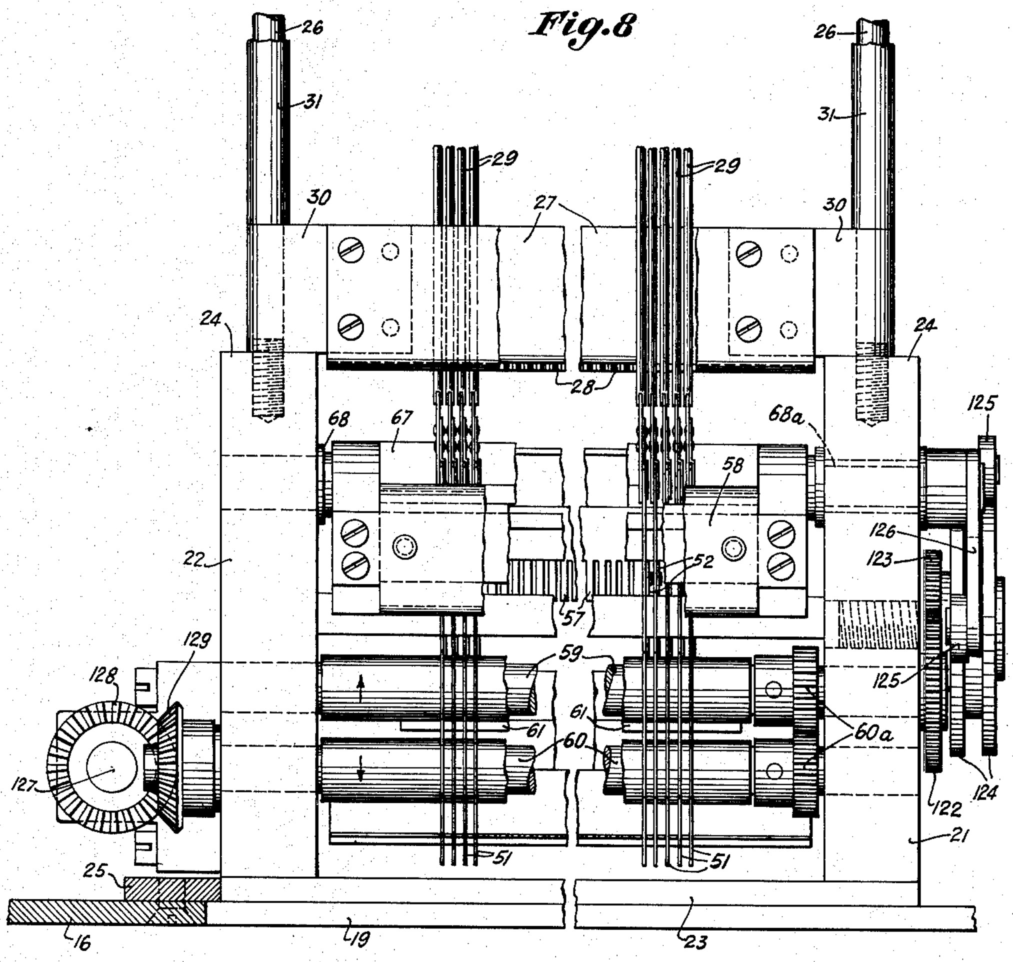
Figures 7, 7A:
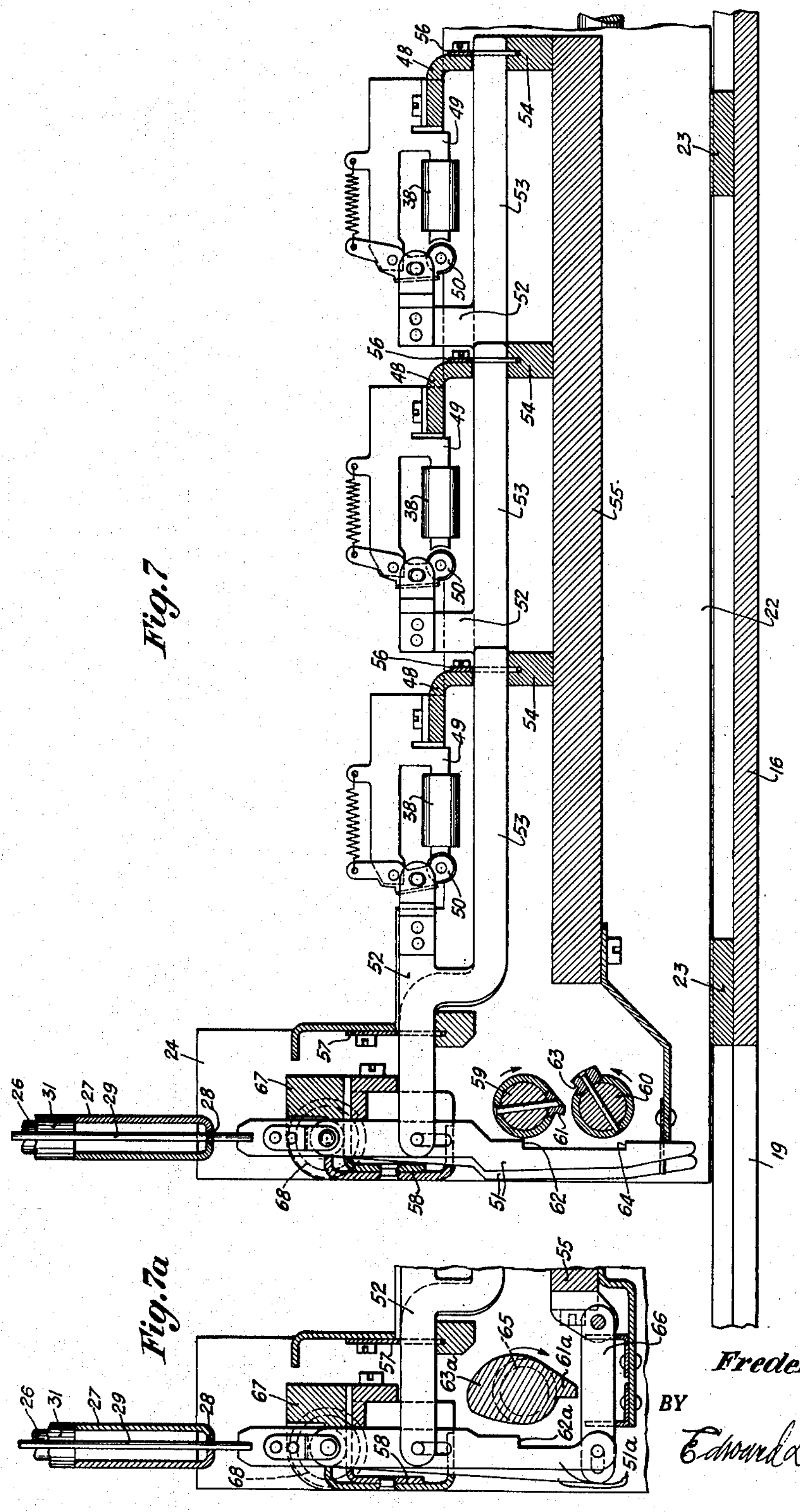
Fig. 7 is a section on the line 7—7 of Fig. 6.
Figure 9:
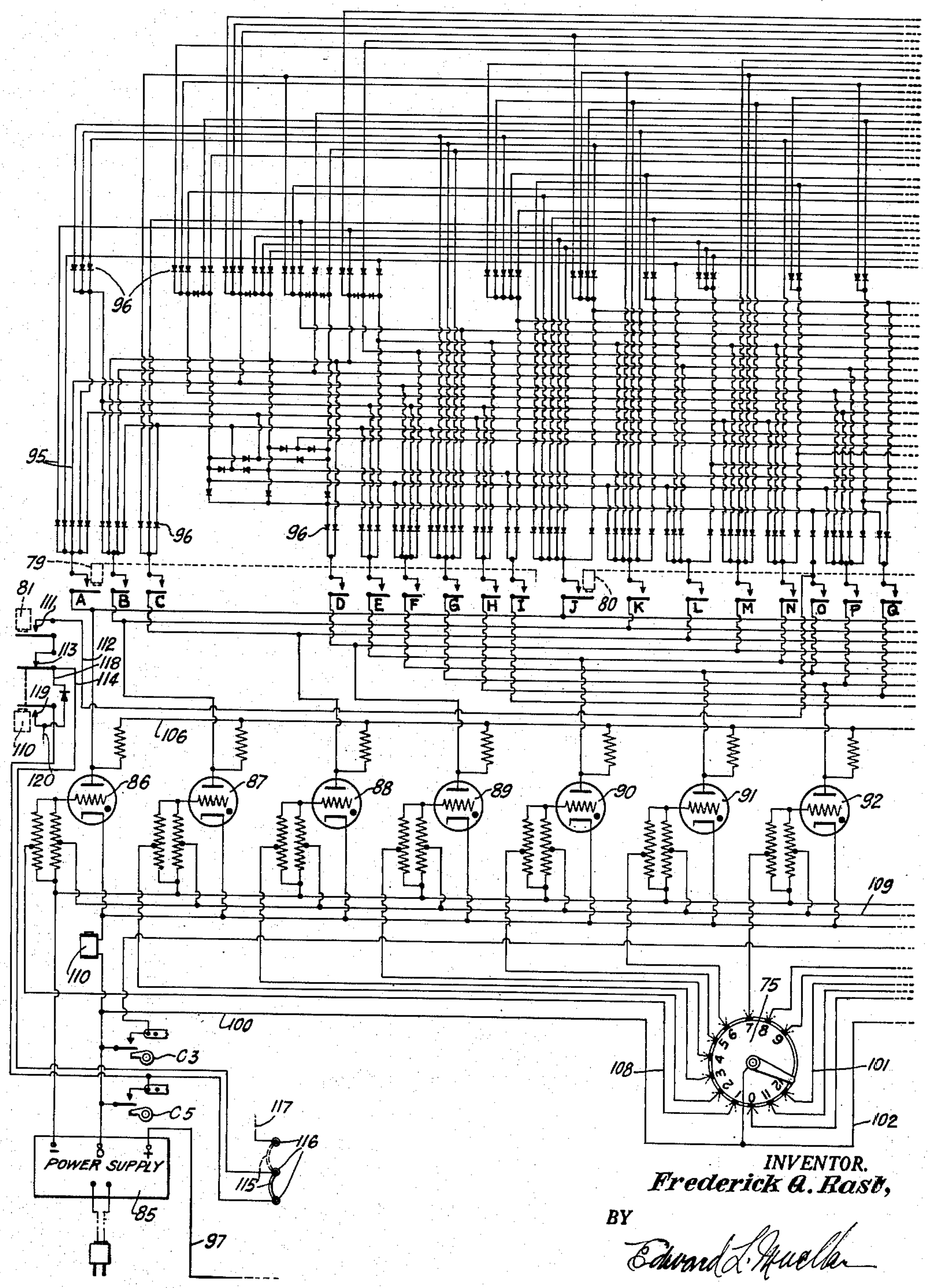
Figure 10:
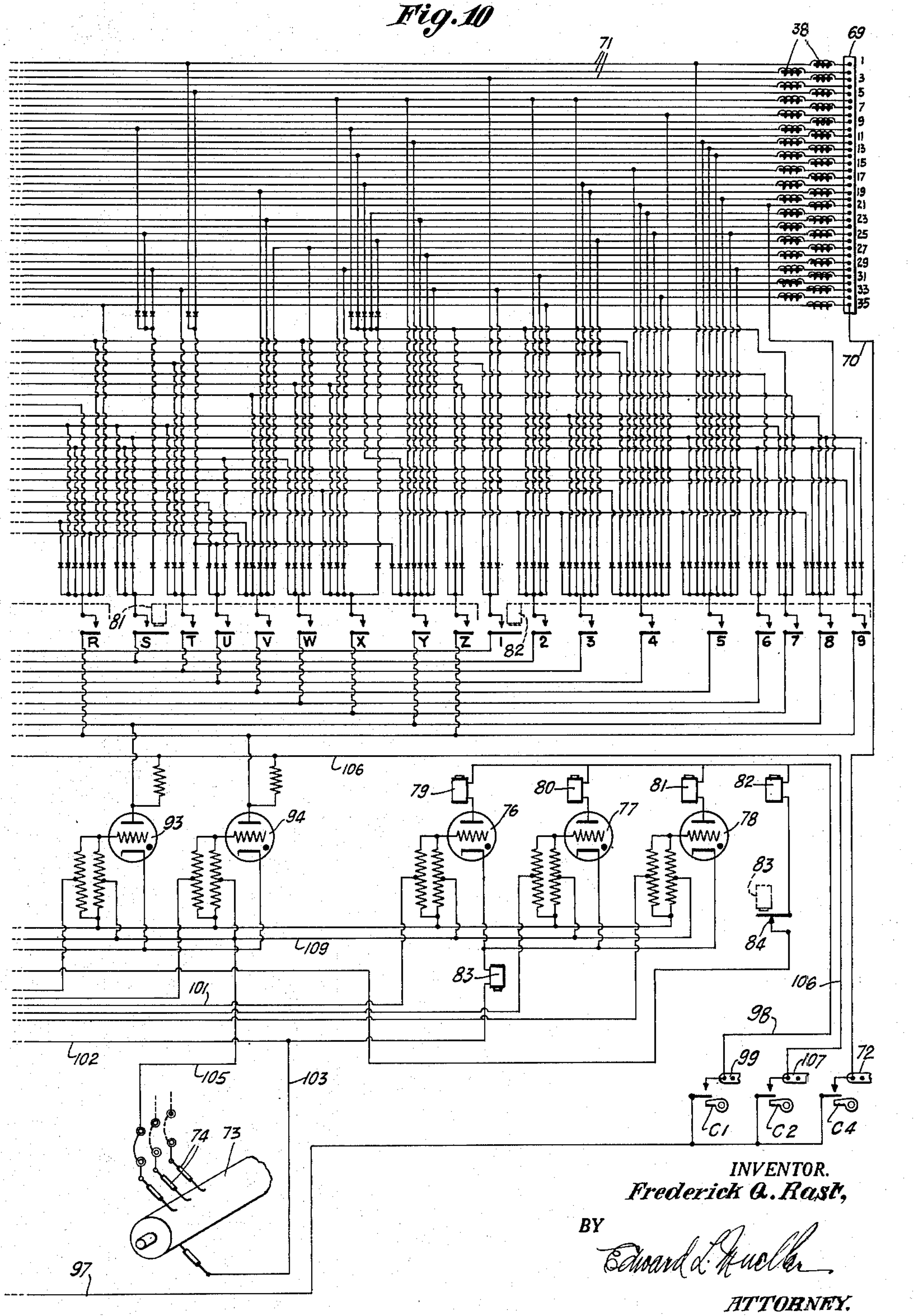

Fig. 7*a* is fragmentary section similar to Fig. 7 showing a modified form of control mechanism for the printing elements;

Fig. 8 is an elevation, partly broken away and shown in section, of the print unit and panel shown in Fig. 7, looking from the left of the latter figure;

Figs. 9 and 10 combine to illustrate diagrammatically the control circuits for each one of the print heads by which selection of the printing elements constituting said head to form any particular character is accomplished in accordance with the analysis of a punched card or similar statistical record;

Fig. 11 is a diagrammatical view illustrating a circuit for controlling the elimination of printing of zeros to the left of a significant figure;

Fig. 12 is a diagrammatic view of a timing chart for the machine;

Fig. 13 is a view showing, diagrammatically, one of the print heads with the various printing elements comprising said head indicated by numerals; and Fig. 14 is a greatly enlarged view of the type of character to be printed.

Figure 1:
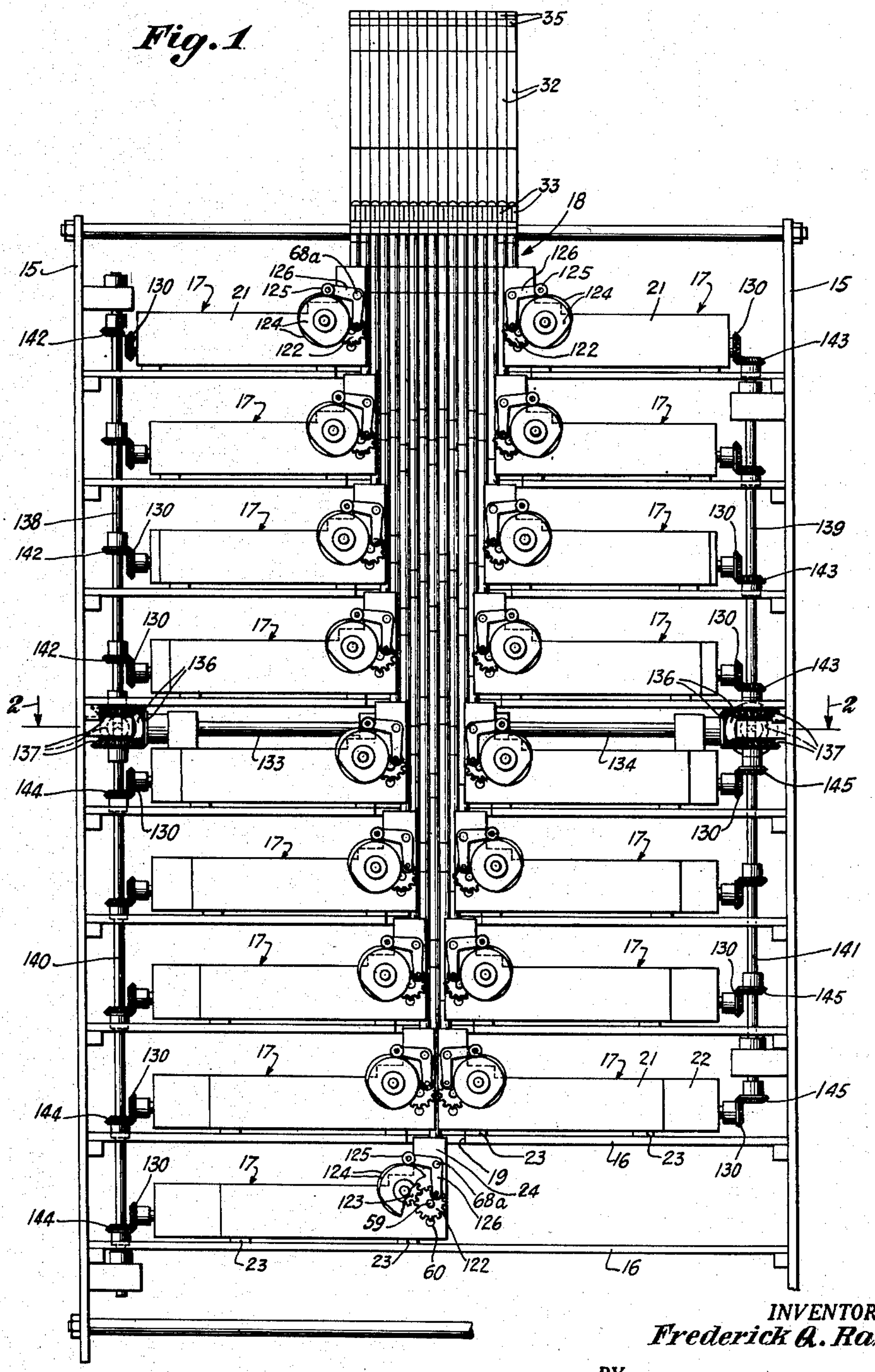
Fig. 1 is a front elevation of a printing machine constructed in accordance with the invention and showing the arrangement of print control units and their associated panels, together with the drive for said units.
Figure 2:
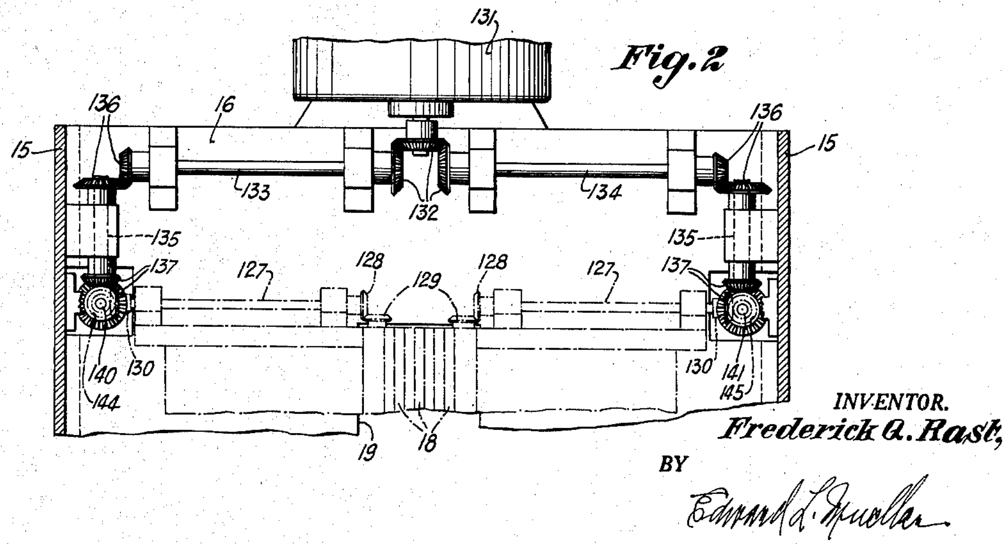
Fig. 2 is a fragmentary transverse section taken substantially on the line 2—2 of Fig. 1, illustrating the main drive connection to the various print control units.

Structurally, as viewed in Fig. 1, the machine comprises a main frame including the opposed side members 15 between which are supported a number of vertically spaced platforms 16 to provide mountings for a series of horizontally arranged print control units 17. The lowermost platform supports only one of such units while the remaining platforms each have mounted thereon two of the units disposed on opposite sides of the vertical center line of the machine. Each of said units is provided at its inner end with a vertically extending panel generally indicated at 18, the panel for the lowermost unit 17 extending coincidentally with said vertical center line and being the longest of all the panels. The superposed units 17 of the various pairs, as they extend upwardly from the bottom of the machine, are spaced a progressively greater distance apart at their inner ends so that each pair is laterally offset with respect to next adjacent units, and said spacing provides for the reception, between each pair of units, of the panels of the lower units, with said panels of the various pairs of units becoming progressively shorter toward the top of the machine. This arrangement of the units 17 with the panels at their inner ends enables said panels to be disposed in abutting relation to each other and to accommodate the same in the spaces between opposed units. In order that the panels may extend through the platforms 16, the latter, above the lowermost one, are provided in their forward edges, as viewed in Figs. 1 and 2, with openings or recesses 19 into which the panels are insertable when assembling the control units in position in the machine, and said openings also progressively increase in width toward the top of the machine so as to receive the increasing number of panels extending upwardly from the various units. There are seventeen of these control units shown, but the number thereof, may be arbitrarily changed to accord with the number of spaces for characters to be contained in a single line of printing. Also, in the present disclosure, each of the panels 18 embodies three print heads in line, said heads being indicated generally at 20 in Fig. 4. With said heads in line relative to each other and to the heads of the other panels 18, it becomes apparent that provision is made herein for fifty-one printing spaces in a single line, and it is also obvious from the arrangement thus far described that the number of said spaces may be varied for any particular machine to be constructed by altering the number of panels and/or the number of print heads per panel.

Figures 3, 4, 5:
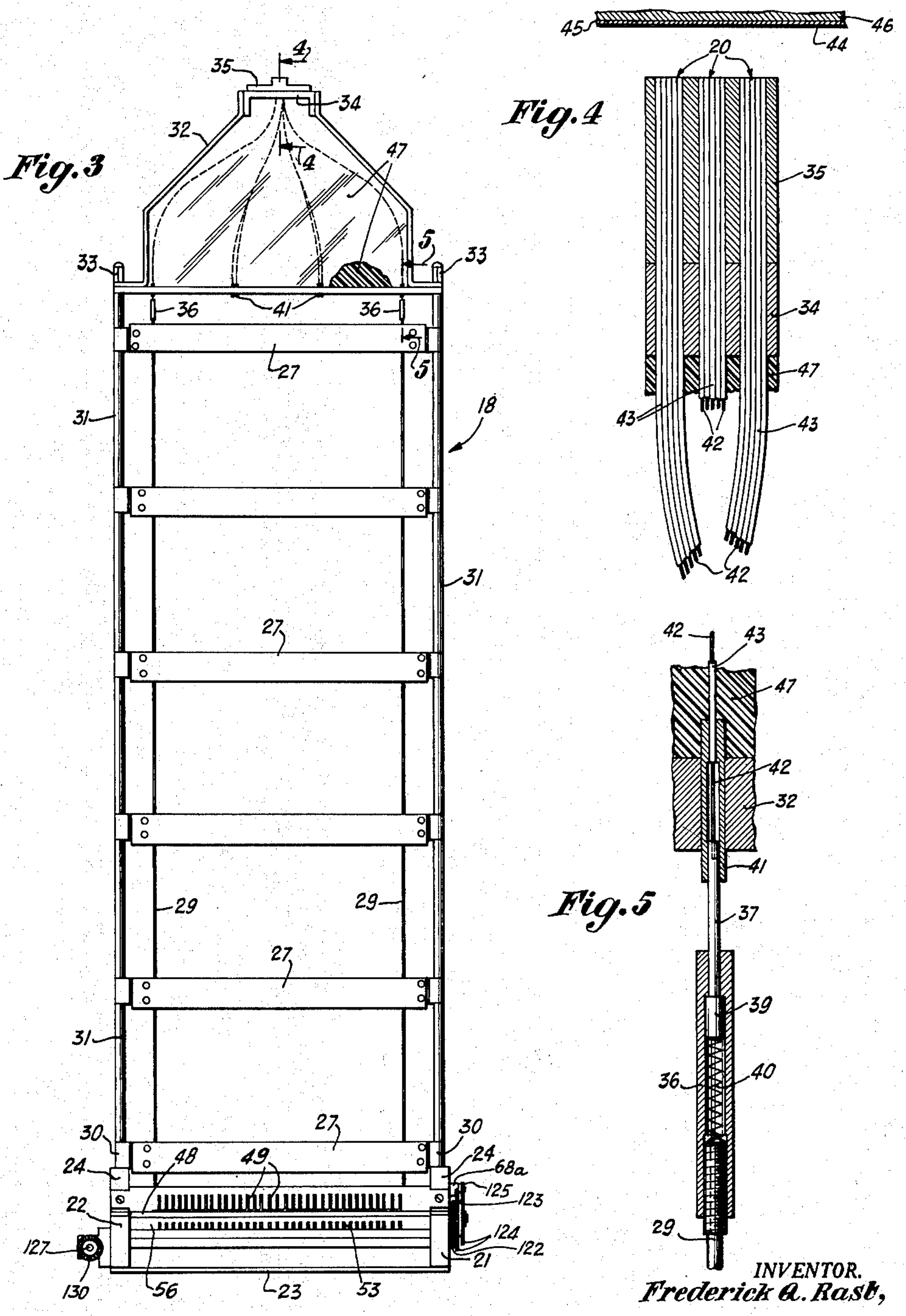
Fig. 3 is a side elevation of the lowermost print control unit shown in Fig. 1, and its associated panel, the view being taken from the end of the unit remote from the panel.
Fig. 4 is an enlarged fragmentary sectional view on the line 4—4 of Fig. 3 showing the print heads at the upper end of a supporting panel and illustrating three such heads each of which is diagrammatically shown in Fig. 13.
Fig. 5 is an enlarged fragmentary section on the line 5—5 of Fig. 3 showing a portion of one of the printing elements which embodies means for cushioning the striking action of the print wire as the same is propelled to its print position.
Figure 6:
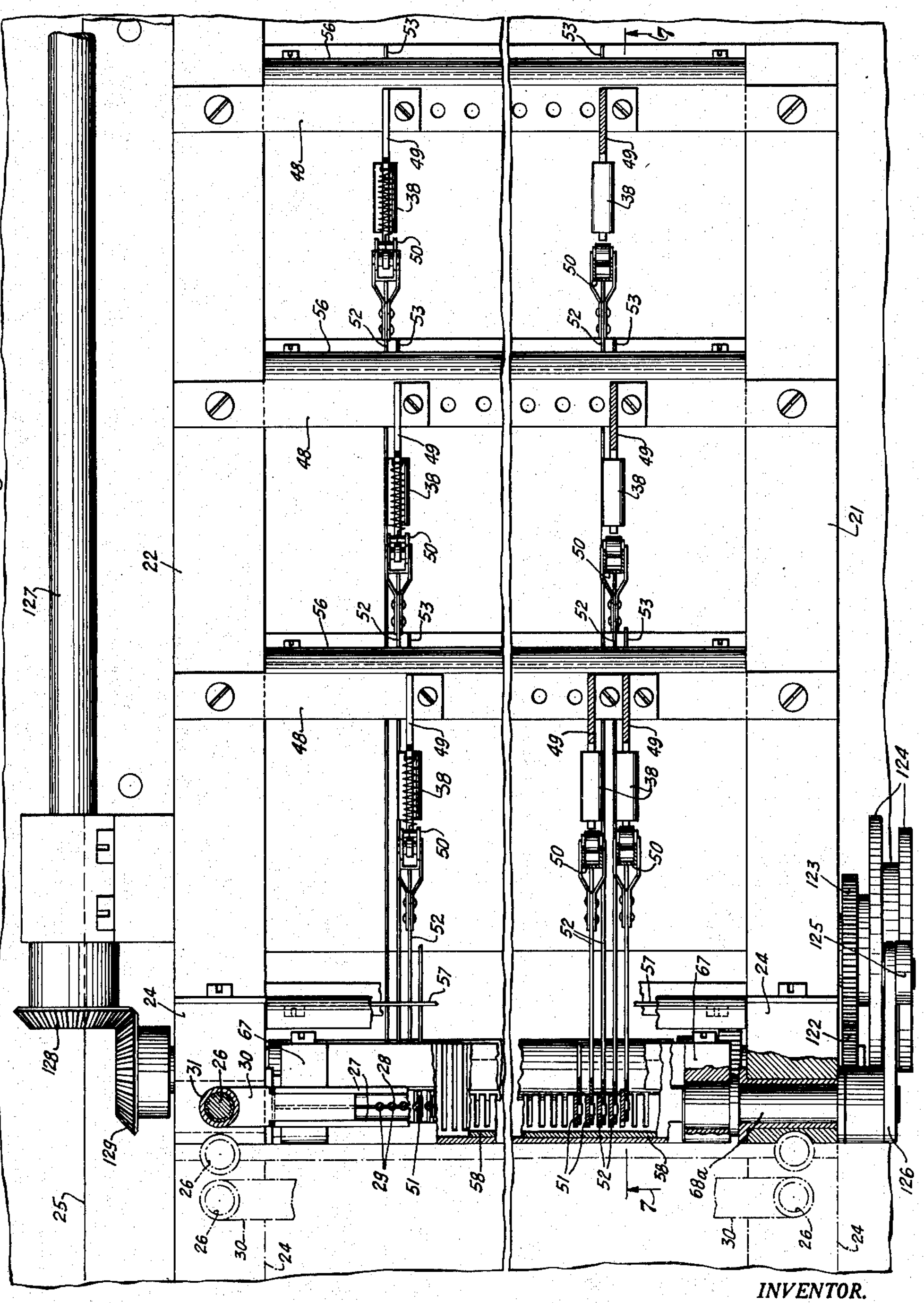
Fig. 6 is an enlarged fragmentary top plan view, partly in section, of one of the print units and its control mechanism, shown on the right side of Fig. 1.

The units 17 are of similar construction with the exception of the height of the panels 18 and the framework of each unit, as best shown in Figs. 6 to 8, comprises the vertical side walls 21 and 22, the lower edges of which are supported on cross bars 23 extending transversely to the platform 16 on which they are mounted. At the inner end of the unit upon which the panel 18 is mounted, the walls 21, 22 are increased in height by the extensions 24 and when the unit is placed upon its platform 16 with the lower edges resting upon the cross bars 23, the wall 21 abuts a cross piece 25 (Fig. 8) secured to said platform so that the unit will be properly positioned. The panel 18 of the unit is mounted upon the extensions 24 and includes two vertical rods 26, the lower end of each being threaded into one of said extensions (Fig. 8). A plurality of horizontally disposed and vertically spaced guide members 27 are removably mounted upon the rods 26 and the number of these guides depends upon the height of the panel. Each guide 27 is formed from a flat sheet of metal bent upon itself (Fig. 8) and is provided in its lower edge with a series of openings 28 through which pass the rods 29 forming a part of the printing elements presently to be described in more detail. The opposite ends of each guide member 27 are provided with sleeves 30 through which the rods 26 extend and the lowermost guide member in the panel has its sleeves resting directly upon the extensions 24, as shown in Figs. 3 and 8. The other guide members of the panel are maintained in vertically spaced relation by the spacer sleeves 31 which are removably mounted upon the rods 26 and interposed between the sleeves 30 of adjacent guide members. The upper end of the panel terminates in a frame 32 secured to the upper ends of the rods 26 by nuts 33. The side walls of the frame converge upwardly and their upper ends are connected by the supporting member 34 which carries a block 35 in which the three print heads 20 of the panel are mounted.

As shown in Fig. 5, the upper end of each of the rods 29 forming part of one of the printing elements is screw threaded to receive the lower open end of a coupling 36 which, in effect, also constitutes a part of the printing element. A connecting rod 37 has a head 39 movable within the coupling 36 and between said head and the upper end of the rod 29 there is interposed a coil spring 40 which exerts upward pressure upon the head 39 and its rod. The upper end of rod 37 extends into a sleeve 41 fixed in the base portion of the frame 32 and suitably secured to said rod is the lower extremity of the printing wire 42. The upper end of the sleeve 41 extends into the space formed by the frame 32 and has secured therein the lower end of a guide tube 43 which projects upwardly through the support 34 and block 35, terminating at the upper edge of the latter. The print wire is movable within the tube 43 and also terminates flush with the upper surface of the block 35 when said wire is in non-print position. When the wire is propelled upwardly to its print position in a manner to later appear, its upper end projects beyond the upper surface of said block and strikes an inking ribbon 44 or other transfer medium so that a dot will be printed upon the sheet 45 mounted upon the platen 46 which is only fragmentarily shown as it does not constitute a part of the present invention. When the rod 29 is impelled upwardly to project its printing wire 42 to print position the spring 40 acts to force the rod 37 upwardly until the printing extremity of the wire engages the ribbon 44 whereupon the coupling member 36 will move relative to the rod 37 and thus compress the spring 40 slightly to thereby cushion the striking effect of the wire against said ribbon and thus avoid the possibility of the wire penetrating the same. As previously mentioned, each printing head 20 comprises a group of thirty-five wires 42 and, as shown in Fig. 3, each of these groups is indicated by two dotted lines which converge upwardly from the base of the frame 32 into the block 35. In order to anchor the guide tube 43 for the printing wires of the various groups the same are embedded in a suitable resinous compound 47 contained within the frame 32.

The mechanism for controlling the operation of the printing elements will now be described by reference to Figs. 6, 7 and 8. It is now understood that each of the units 17 contains the mechanism for controlling the printing elements of three print heads and that there are thirty-five of said elements in each head. In the embodiment being described, and as in the previously mentioned co-pending application, each printing element is under the control of an electromagnetic device 38 the energization of which results in the propulsion of said element from its non-print to print position in a manner to appear in the course of the description. With one of said devices 38 for each element, there are contained within each unit 17 one hundred and five of said devices for the three print heads assigned to said unit. As best shown in Figs. 6 and 7, the devices are supported by means of cross bars 48 secured to the upper edges of the walls 21, 22 and spaced therealong, with the core piece 49 of each device secured to one of said bars. Said core piece has pivoted thereto a spring controlled armature 50. The lowermost device 38 shown in Fig. 6 and which is the one at the left in Fig. 7, is shown energized while the armatures of the remaining devices in said figures are in normal position. As will be noted by reference to the three lowermost magnets 38 in Fig. 6, the same are arranged in longitudinally offset relation and each is supported by a different bar 48; and this arrangement is carried out with respect to all similar groups of three magnets throughout the unit in order that their associated parts which control the operation of the various printing elements may be closely assembled in contact form.

Each of the magnets 38 has assigned thereto an oscillatory interposer 51, and said interposer is connected at its upper end to one of the rods 29 so that it, in effect, forms a part of a printing element and is also joined to the armature 50 of a magnet by a connector 52 having an extension 53 which, with respect to the interposer, projects horizontally to the right and beneath its associated magnet, with the forward end of each connector having a pin and slot connection with its interposer. From left to right in Fig. 7, the extensions 53 of the various connectors become increasingly longer and all of them are supported for slight sliding movement upon the cross bars 54 mounted on the platform 55 extending between the walls 21, 22, and are guided by combs 56 secured to the bars 48 and engaged in the bars 54, said connectors being further guided adjacent the interposers 51 by another comb 57. All of the interposers 51 are oscillated in unison from their inoperative position, in which they dwell for a considerable portion of an operating cycle, to an operative position by means of a bail 58 the operation of which will be later described in detail, and when said interposers are so operated they simultaneously close, through the connectors 52, the armatures 50 of all of the magnets 38. The timing in said operating cycle is such that any printing element which is to be propelled to its print position has its associated magnet 38 energized after the closure of its armature and before the interposer 51 connected thereto can be returned to its inoperative position by the action of the armature spring. The energized magnet thus momentarily retains its interposer in operative position while all the other interposers whose magnets are not energized return to inoperative position under the influence of the armature springs, the bail 58 also restoring a very short interval after having moved the interposers to their operative position. It is during the time when the interposers which are being held in operative position that they have imparted thereto an upward movement which is transmitted, through the rods 29, to the print wires 42 to propel them to print position where they dwell for an instant and are then restored to non-print position by a reversal of the upward movement of the interposers.

In the embodiment of Fig. 7, the operation of propelling the operative interposers 51 and their printing elements to print position and then returning the interposers to restore said printing elements to non-print position is accomplished by two shafts 59 and 60 connected by gears 60*a* (Fig. 8) to rotate continuously in opposite directions as indicated by the arrows. The shaft 59 carries the actuator member 61 common to all the interposers of the print unit 17 and which, following the energization of any of the magnets 38 with the consequent momentary retention of their interposers in operative position, will engage the shoulders 62 of said interposers and thereby impart upward movement thereto. Those interposers which are not retained in their operative positions, because of the non-energization of their magnets 38, are restored to inoperative position by the armature springs of said magnets before the actuator 61 contacts the shoulders 62 of the operative interposers. The shaft 60, rotating in the opposite direction, carries a restoring member 63, also common to all interposers, and so positioned in angular relation to the member 61 on the shaft 59 that after the latter member disengages from the shoulders 62 said member 63 engages the shoulders 64 of all elevated interposers and, by its rotation, restores said interposers to their normal or lowered positions with the result that the printing elements connected to said interposers are also restored to non-print position. This action occurs at the beginning of the next operating cycle and after all the magnets 38 are de-energized so that their armature springs will actuate the connectors 52 to thereby return the interposers to their inoperative position preparatory to the start of the succeeding cycle of operation.

In the form of the invention shown in Fig. 7*a*, a single shaft 65, rotating in the direction of the arrow, replaces the two shafts 59 and 60 and has formed thereon an actuating member 61*a* and a cam shaped restoring member 63*a*. Each interposer 51*a* is provided with but one shoulder 62*a* to be engaged by the member 61*a* to elevate the interposer and its printing element, and the lower end of each interposer is linked, by a pin and slot connection, to an arm 66 pivoted to the adjacent end of the platform 55. Said arm is arranged in the path of rotation of the restoring cam 63*a* which is so formed that following the disengagement of the member 61*a* from the shoulder 62*a* at the conclusion of the upstroke of the operative interposers 51*a*, said cam will initially engage the upper edges of all of the raised arms 66 and force them downwardly to thus restore their connected interposers and printing elements. Subsequent to this action, the cam 63*a* then engages the rear vertical edges of the operated interposers below the shoulders 62*a* thereof to thereby positively return said interposers to their inoperative positions, without relying upon the armature springs to accomplish this restoration through the connectors 52, as in Fig. 7. The restoration of the interposers occurs with the bail 58 in its normal position to which it returns immediately after having advanced the interposers to operative position. In both forms of the invention, said bail 58 is supported by a rocking member 67 mounted on trunnions 68, 68*a* (Fig. 8) having bearings in the extensions 24 of the side walls 21, 22, respectively.

The means for periodically oscillating the rocking member 67 of each unit 17, and consequently the bail 58 thereof, is controlled from the continuously driven shaft 59, or the shaft 65 of the Fig. 7*a*, which is provided at one end (Fig. 8) with a gear 122 meshed with a similar gear 123 supported for rotation by the side wall 21. Said gear 123 carries the complemental cams 124 each of which is engaged by one of the rollers 125 of a rocking follower 126 secured to the end of the trunnion 68*a* projecting from the wall 21. The cams are so formed that as they rotate through the initial portion of the operating cycle, the follower 126 remains stationary and, therefore, the rocking member 67 and its bail 58 do not move, as indicated in the timing chart (Fig. 12). Then said cams begin to rock the follower and, in so doing, the bail 58 is actuated to move the interposers 51 toward their operative positions which they reach at the time of the energization of the magnets 38 selected for energization. The cams 124 then maintain the bail and its interposers in their operative positions for a short duration sufficient for the selected magnets 38 to become fully energized, whereupon said bail is restored by the reversal of the follower 126 under the influence of said cams to thus permit those interposers which are not held in operative position by their magnets to return to normal by the action of the armature springs of the associated magnets. This restoration of the interposers is completed at the time the actuator 61 or 61*a* engages with the shoulders of the operative interposers to advance the printing elements.

The mechanism for driving the shafts 59, 60 of Fig. 7, or the single shaft 65 of Fig. 7*a*, and for effecting the synchronous operation of all the units 17 will now be described. Each unit 17 is provided with a longitudinally extending drive shaft 127 mounted in bearings on the side wall 22 and carrying a bevel gear 128 at its inner end adjacent the panel 18 of said unit, which gear meshes with a similar gear 129 on the shaft 60 of Fig. 7, or the shaft 65 of Fig. 7*a*. The shafts 127 of the various units 17 are provided at their outer ends (Fig. 1) with bevel gears 130 by means of which all said shafts are driven in unison from a prime mover such as a motor 131 (Fig. 2) suitably supported by an intermediate platform 16. Said motor is geared at 132 to the adjacent ends of two aligned shafts 133 and 134, also mounted on said platform so that said shafts are driven in opposite directions. Countershafts 135 journaled in the side members 15 of the main frame are geared at 136 to the outer ends of the shafts 133, 134 and are further geared at 137 to two upper vertical shafts 138 and 139 on opposite sides of the machine and to two similarly arranged lower shafts 140 and 141. The two upper shafts are driven in opposite directions by the countershafts 135 and the two lower shafts 140, 141 are similarly driven, with the vertically aligned shafts 138, 140 and 139, 141 being also driven in opposite directions relative to each other. Bevel gears 142 and 143 on the shafts 138, 139 have their positions reversed on said shafts with respect to each other and mesh with the gears 130 of the adjacent units 17 located in the upper portion of the machine and, by this reversed position of the gears 142, 143, the shafts 127 of said units are all driven in the same direction. Similarly, with the shafts 140, 141 being driven in opposite directions and the gears 144 and 145 on the respective shafts relatively reversed and meshing with the gears 130 on the shafts 127 of the units 17 in the lower portion of the machine, the latter shafts will be driven in the same direction as the shafts 127 of the upper units, and thus complete uniformity of operation will be accomplished throughout the units 17 of the entire machine.

Reference is now had to Figs. 9 and 10 which illustrate the circuits that selectively control the thirty-five electromagnetic devices 38 allotted to the printing elements of one print head, the circuits for the remaining print heads being duplicates of those shown. Devices 38 are selectable for energization in various combinations and in accordance with any desired code such as the well known two-hole combinational code for alphabetical characters wherein twelve index point positions are provided in each column of a card. The first three of said positions to be sensed for an alphabetical character in each card column are designated in Fig. 12 as #12, #11 and #0 and are the zoning points assigned, respectively, to the letters A–I, J–R and S–Z, each of said letters having further assigned thereto in its column one of the other numerical index points 1 to 9. In this code and in the system herein shown, the character 0, whether it is employed to designate the letter or a zero, is formed by the energization of the same group of devices 38 but, as will be seen in the course of the description, the selection of said group for the printing of a zero is accomplished differently for the letter. The coils of said devices each have one terminal thereof joined to a common bus bar 69 connected to a conductor 70, and the other terminal thereof to an individual conductor 71, and said conductor 70 is connected to a bus 72 to which all similar conductors of the various print heads are joined.

A record card feed mechanism (not shown) of any desired construction successively feeds the cards to a sensing device conventionally illustrated as comprising the contact roll 73 and a series of brushes 74, one for each card column, which progressively sense punched index points in the card columns as the card is fed between the roll and brushes, and a distributor 75 operates in synchronism with the feed of the cards so that the wiper thereof will successively engage its twelve contacts simultaneously with the sensing of the corresponding index points in the card columns, all said contacts being multiplied to the other print heads.

Assigned to the index point positions #12, #11 and #0 of each column of the record card are the three zoning Thyratrons 76, 77 and 78 of standard construction which have the characteristic of remaining conductive, once they are fired, until the voltage is removed from the plate elements thereof. The plate elements of said tubes 76, 77 and 78 are connected to associated zoning relays 79, 80 and 81, and the firing of any one of said tubes by the sensing of a hole at a zoning index point position in the card simultaneously with the engagement of the wiper of the distributor 75 with a contact corresponding to said point, determines the zone of the alphabetical character to be printed. Thus, when the tube 76 is made conductive through the brush 74 and the distributor 75, its relay 79 will be energized, and remain so as long as the tube is conductive, to close its nine contacts desginated A to I (Fig. 9), thereby determining that the character to be printed is contained within this group. In the same manner, energization of relays 80 or 81 establishes that the character to be printed is in the J to R or the S to Z groups. The contacts A to Z of the various zones are connected to different groups of the conductors 71 leading to the electromagnetic devices 38 so that when final selection of any contact in any one of said zones is made, in a manner to later appear, by the sensing of the second hole in a card column, the devices 38 assigned to said contact will be energized and their respective printing elements will be advanced to print position. A fourth zoning relay 82 is assigned to the printing of the numerals 1 to 9, but if either one of the tubes 76, 77 or 78 is fired, a relay 83 multiplied to the cathode elements of said tubes is energized and, by opening its back contact 84, will disconnect relay 82 from the power supply 85 (Fig. 9). On the other hand, if no zoning tube is fired to effect the printing of an alphabetical character due to the failure of the sensing brush 74 to sense a hole at any one of the zoning index points, relay 82 will be energized to close its group of contacts 1 to 9 shown at the right of Fig. 10 to await the sensing of a hole in a card column designating the particular numeral to be printed.

With any one of the tubes 76 to 78 rendered conductive and its corresponding set of alphabetical contacts closed, the second hole of the two-hole combination in a card column is then sensed by its brush 74 and, through the distributor 75, this results in the firing of one of the nine Thyratrons 86 to 94 identified by the sensed hole and the establishment of circuits through one of said sets of alphabetical contacts in the selected zone to the group of devices 38 which are to control the particular alphabetical character to be printed. Rectifiers 96 are interjected in all circuit groups at points where it is desired to prevent the shunting effect of unrelated circuit groups which may have connection to the same conductor.

As one specific example, it will be assumed that the letter A is to be printed. Said letter, when printed, takes the form shown in Fig. 14 and, by reference to Fig. 13 wherein the printing elements 30 of a head are diagrammatically designated by the numerals 1 to 35, it will be seen that the elements to be actuated, and consequently the devices 38 (also numbered 1 to 35 on the bus bar 69) to be energized in order to print said letter, are identified in Fig. 13 by the eighteen numerals 2, 3, 4, 6, 10, 11, 15, 16, 17, 18, 19, 20, 21, 25, 26, 30, 31 and 35. Thus, the contact A is connected by the group of conductors 95 to the eighteen conductors 71 through which the circuits of the selected electromagnetic devices 38 will be energized. As another example, the contact for the numeral 1 controlled by the relay 82 has three conductors leading therefrom which are connected to seven conductors 71 joined to a corresponding number of devices 38 identified in Fig. 13 and on the bus bar 69 by the numerals 3, 8, 13, 18, 23, 28 and 33.

The cycle of operation for printing various characters will now be described specifically in connection with the printing of the letter A which involves the successive sensing, by the brush 74, of the punched index points #12 and #1 in the card column assigned to said brush, which sensing results in the firing of the Thyratrons 76 and 86. Immediately upon entry of the leading edge of a card between the roll 73 and brush 74, the code holding cam $c1$ (Fig. 10) closes its contact and remains in this condition throughout the entire operating cycle including the printing of the selected characters, as indicated in Fig. 12. At the beginning of the cycle, the three zoning Thyratrons 76 to 78 and the nine numeric Thyratrons 86 to 94 are nonconductive due to the application of a negative bias from the power source 85 through the bridge network of each tube to the grid thereof and, upon closure of the contact of holding cam $c1$, positive voltage is applied to the plate elements of the tubes 76 to 78 from the source 85 over the conductor 97, through the contact of said cam, the conductor 98 connected to the bus 99 common to all the print heads and the windings of the respective relays 79 to 81. The brush 74 now starts to successively sense the index point positions #12, #11 and #0 and, simultaneously therewith, the wiper of the distributor 75 successively engages contacts corresponding to said points. Since the index point #12 is punched for the letter A, contact by the brush 74 will be made with the roll 73 and, with the distributor wiper simultaneously engaging its contact #12, zero potential from the intermediate terminal of the source 85 will be applied through the conductor 100, the #12 contact of said distributor, and the conductor 101 to one midpoint of the bridge network connected to the grid element of the zoning tube 76 and, at the same time, said potential is connected, by said conductor 100, to the other midpoint of said network over the conductors 102 and 103, roll 73 and brush 74, and conductors 105 and 109. The grid voltage is thereby raised to zero, causing said tube to fire, whereupon current will flow from the positive terminal of source 85 through the cam $c1$, the windings of relays 79 and 83 connected, respectively, to the plate and cathode elements of the tube 76, and then over the conductors 102 and 100 to the intermediate terminal of the source 85, and said relays will be energized and held so by the cam $c1$. Energization of relay 83 opens its back contact 84 to thereby disconnect the positive terminal of the source 85 from the winding of the numerical zoning relay 82 and thus prevents the latter from closing its contacts 1 to 9. Relay 79 closes its group of contacts A–I and the zone in which appears the character to be printed is now selected.

The card being analyzed now passes its #11 and #0 index points under the brush 74 but, since no hole is punched at either of said points, the tubes 77 and 78 are not fired and, consequently, the other two sets of alphabetical zone contacts of relays 80 and 81 remain open. Immediately upon completion of the sensing of the three zoning points on the card, the numeric tube holding cam $c2$ is operated to close its contact to thereby prepare a holding circuit for any one of the subsequently fired numerical tubes 86 to 94, said circuit extending from the positive terminal of source 85 through the contact of cam $c2$, and the conductor 106 connected to the bus 107 to which all similar conductors of the circuits for the remaining print heads are joined, said conductor 106 being connected through a resistance to the plate element of each of said numeric tubes. Said cam $c2$ maintains its contact closed throughout the sensing of all nine numerical index points, as indicated in Fig. 12, and until the printing elements have been advanced to their printing position.

The brush 74 now senses the hole punched in the #1 index point which completes the combinational code for the letter A and, at the same instant that said hole is being sensed, the numeric zone cam c3 (Fig. 9) closes its contact and holds it closed, for a purpose which will later appear, until the printing operation is completed. When hole #1 is sensed in the card, the wiper of distributor 75 also engages its #1 contact, thereby connecting zero potential from the source 85 over the conductors 100 and 108 to one midpoint of the bridge network of tube 86, while the other midpoint of said network is connected to said potential over the conductors 102 and 103, the roll 73 and brush 74, and conductors 105 and 109, thus raising the grid voltage of said tube to zero and causing the same to fire. The tube is maintained conductive from the intermediate terminal of source 85 through the winding of relay 110, the tube 86 and its holding resistor, the common conductor 106, and the contact of cam c2 to the positive terminal of said source 85. Relay 110 is energized by the current flowing from the plate of said tube 86, for a purpose to later appear in connection with the elimination of zeros to the left of a significant figure.

Brush 74 now continues to sense the remaining numerical index point positions and upon the sensing of the last or #9 position, the print cam c4 closes to establish circuits from the positive terminal of the source 85 for the energization of the eighteen previously mentioned electromagnetic devices 38 whose associated printing wires 42 form the letter A, said circuits extending from the positive terminal of source 85 over the conductor 97, the contact of cam c4, conductor 70 and bus 69, the windings of the eighteen devices 38, the conductors 71 connected to said windings, the conductors 95, the contact A of the zoning relay 79, the tube 86 and through the winding of relay 110 to the intermediate terminal of the source 85. All of said devices 38 now energize, as previously described, to thus permit the respective printing elements to be advanced to their print position. During the initial stage of the sensing of the card, the bail 58 dwells in the position shown in Figs. 7 and 7a and indicated in Fig. 12, and then advances to move the interposers 51 toward their operative positions which they reach at the instant that the print cam c4 is closed. Said bail then dwells for a short period and recedes to its normal position in sufficient time to permit the restoration of all inoperative interposers before the actuator 61 engages those interposers which are active. The printing elements connected to the latter interposers are then propelled upwardly, as indicated in Fig. 12, and dwell for a very short period until the end of the card cycle is reached, whereupon they are returned by the restoring member 63 at the beginning of the next card cycle.

In the event that no one of the three zoning tubes 76 to 78 is fired due to the failure of the brush 74 to sense a hole in the three zoning points on a card, thus indicating that a numerical character is to be printed, it will be apparent from the foregoing that relay 83 connected to the cathode elements of said tubes will not be energized and therefore its back contact 84 will remain closed. Hence, as soon as the cams c1 and c3 close their contacts, an energizing circuit for the numerical zoning relay 82 will be established extending from the source 85 through the conductor 97, the contact of cam c1, conductor 98, winding of relay 82, back contact 84 of relay 83 and the contact of cam c3 to the intermediate terminal of the source 85. Upon energization of relay 82 in this circuit, its group of numerical contacts 1 to 9 are closed and await the sensing of the hole punched in one of the numerical index points in the card column. When this occurs, zero potential will be applied to the grid of one of the tubes 86 to 94, depending upon which hole is sensed, through the brush 74 and distributor 75 in a manner which will now be understood. Said tube will then fire and will remain conductive through the contact of cam c2 and conductor 106, as previously described. Upon closure of the printing cam c4 at the conclusion of the sensing of the last index point position of a card, energizing circuits will be established for the electromagnetic devices 38 which are selected to effect the printing of the desired numerical character, said circuits extending, as previously described, through said cam c4 and over the conductors 71 which are connected to the numerical contact of relay 82 that extends to the plate element of the fired tube, and from thence the circuit extends through the winding of relay 110 to the intermediate terminal of the source 85. Energization of the selected group of devices 38 causes the associated printing elements to be advanced under the control of the actuator 61 to print the desired numeral.

With respect to the character 0, it has been previously mentioned that the same is formed by the energization of the same group of electromagnetic devices 38 whether said character is to indicate a letter or a zero, but that the selection of said group to print the letter is accomplished differently than when a zero is to be printed. This difference originates in the code punching in a card column and the consequent firing of different Thyratrons during the course of the analysis of said column. The letter is formed by punching the index points #11 and #6, while for a zero, only the zoning index point #0 is punched. From the foregoing description, it will now be understood that the group of conductors connected to the contact 0 controlled by the relay 80 and selected for the energization of the devices 38 which control the printing of the letter O, is accomplished by the firing of the zoning tube 77 and the numerical tube 91. When only the #0 index point position is punched in the card column, indicating that a zero is to be printed, only the zoning tube 78 is fired and, at the conclusion of the sensing of said column, the zero print cam c5 (Figs. 9 and 12) is closed. Firing of the tube 78 energizes the relay 81 in series therewith, closing its contacts S to Z, but this will have no effect since none of the numerical tubes 86 to 94 is fired to extend the circuits for the devices 38 through any one of the latter tubes. However, the closure of the additional contact 111 (Fig. 9) of relay 81 will connect the conductor 112 leading from said contact to the conductor to which the 0 contact of relay 80 is joined, and this will extend the circuits for the energization of the devices 38 which control the printing of the character 0, from the contact 111 through the back contact 113 of relay 110 which is not energized at this time due to the non-conductive condition of all the tubes 86 to 94, and thence over the conductors 114, plug 115 in the full line position of Fig. 9, and the contact of the zero print cam c5 to the intermediate terminal of source 85, whereupon the selected devices 38 will be energized. At the conclusion of any printing operation, all five of the control cams heretofore described open their contacts to de-energize all devices 38 and relays in the various circuits, and again render all Thyratrons non-conductive preparatory to the next card analysis.

In a tabulating card wherein a field thereof is allotted to the entry of amounts, it is common practice, for the purpose of subsequent verification of the entries made therein, to punch the index points #0 in all columns in said field to the left of a significant figure therein and to thereafter, in the tabulation of such entries, eliminate or suppress all zeros to the left of said figure.

Such elimination will now be described by reference to Fig. 11 wherein there are fragmentarily shown four of the circuits illustrated in Figs. 9 and 10. The first circuit unit to the left is set up, as in Fig. 9, for the printing of all zeros by connecting the plug 115 to the two lower jacks 116 so that a zero will be printed as above described, and it will be assumed that the three serially arranged circuit units to the right, and any required additional ones (not shown), are assigned to the columns of an amount field in each of the cards to be analyzed. In order to eliminate zeros to the left of significant figures in the printing of entered amounts in said field, the first circuit unit of highest denominational order (the second to the right in Fig. 11) is not plugged in at its jack terminals, while all remaining circuit units to the right of lower denominational order have their two upper jacks connected each by a plug 115. With respect to said first circuit unit in the amount field, it will be apparent from the previous description that if the letter "O" is to be printed, which involves the firing of tubes 77 and 91, the 0 contact of the zoning relay 80 will be closed to extend the circuit from said contact to the tube 91 which results in the printing of said letter, but the current will not pass from the conductor 112 through the contact 111 of the zoning relay 81 which is not energized at this time since the zoning tube 78 is not fired. Due to the lack of connection between terminals 116 of said first circuit unit in the amount field, it will not print a zero in response to the sensing of only the third zoning index point in a card column, which sensing results in, first, the firing of tube 78 and energization of zoning relay 81 to close the contact 111 of said relay and, second, the retention of the back contact 113 of relay 110 in closed position because of the failure of the latter relay to be energized through one of the tubes 86 to 94. Said conditions extend the conductors 71 leading to the 0 contact over the conductor 112 and contacts 111 and 113 to the conductor 114 connected to the unplugged middle jack 116 where the circuit terminates and, therefore, no printing of a zero in said first circuit unit takes place. In the second of said circuit units assigned to the amount field, should only the "O" index point be punched in the card column individual to said unit, the conductor 114 of the latter will be extended through the plug 115 connecting the two upper jacks 116, and over the conductors 117 and 118 to the conductor 114 of the first circuit unit, and again a zero will not be printed. On the other hand, if a significant figure is to be printed by said second circuit unit, its relay 110 will be energized, by reason of the firing of one of the tubes 86 to 94, to close its front contact 119 and open its back contact 113 to permit of a zero to the right of said significant figure being printed by the third circuit unit of lowest denominational order over a circuit extending from conductor 112 of said third unit, the then closed contact 111 thereof, back contact 113 of relay 110 which is not now energized, conductor 114, plug 115, conductor 120 connected to conductor 118 of said second or next adjacent circuit unit, front contact 119 of the now energized relay 110 in the latter unit, the common conductor 121, the contact of zero print cam c5 now closed, to the intermediate terminal of the source 85, the circuit being completed from the positive terminal of said source through the devices 38 and conductors 71 which are instrumental in printing the character "O." Thus it will be seen that zeros to the left of a significant figure are eliminated, but that those to the right are printed.

It will be readily apparent that the recording elements 20 may be varied in number, size and group arrangement as desired for the type of data to be recorded and may be employed to effect recording in forms other than printing. Instead of being printing elements which deposit ink on a record sheet or card, the recording elements 20 may be indenting or perforating punches arranged in groupings suited for producing on or in the record sheet or card or other medium, marks, indentations or perforations arranged either as numeric or alphabetic characters or as code representations of such characters or other data and the terms "recording" and "data representations" are employed in the appended claims in that sense.

What is claimed is:

1. In a printing machine, a plurality of printing elements grouped to form different characters and selectively operable in various combinations each capable of printing one of said characters, an electromagnetic device individual to and cooperating with each of said elements and selectively operable in groups to identify by their energization the combinations of printing elements required to print said characters, means to selectively energize a group of said devices, an interposer for each of said printing elements, means to move said interposers from inoperative to operative positions prior to the energization of the selected group of said electromagnetic devices, connections between each of the latter devices and one of said interposers for maintaining the latter in operative position upon energization of the selected group of electromagnetic devices, and means thereupon engageable with said interposers to move their respective printing elements to print position.

2. In a printing machine, a plurality of printing elements grouped to form different characters and selectively operable in various combinations each capable of printing one of said characters, an electromagnetic device individual to and cooperating with each of said elements and selectively operable in groups to identify by their energization the combinations of printing elements required to print said characters, means to selectively energize a group of said devices, an interposer for each of said printing elements, means to move said interposers from inoperative to operative positions prior to the energization of the selected group of said electromagnetic devices, connections between each of the latter devices and one of said interposers for maintaining the latter in operative position upon energization of the selected group of electromagnetic devices, means initially engageable with said interposers to move their respective printing elements to print position and subsequently engageable with said interposers to move them to inoperative position, and a member connected to each interposer and also engageable by the last named means to operate said interposer to restore its associated printing element to non-print position.

3. In a printing machine, a plurality of printing elements grouped to form different characters and selectively operable in various combinations each capable of printing one of said characters, an electromagnetic device individual to and cooperating with each of said elements and selectively operable in groups to identify by their energization the combinations of printing elements required to print said characters, means to selectively energize a group of said devices, an interposer for each of said printing elements, means to move said interposers from inoperative to operative positions prior to the energization of the selected group of said electromagnetic devices, connections between each of the latter devices and one of said interposers for maintaining the latter in operative position upon energization of the selected group of electromagnetic devices, an actuating member engageable with said interposers to move their respective printing elements to print position, and a restoring member having means thereafter engageable with said interposers to return their respective printing elements to non-print position.

4. In a printing machine, a plurality of printing elements grouped to form different characters and selectively operable in various combinations each capable of printing one of said characters, an electromagnetic device individual to each of said elements and selectively operable in groups to identify by their energization the combinations of printing elements required to print said characters, means to selectively energize a group of said devices, an oscillatory bail, a plurality of interposers connected to said printing elements and operated by said bail for movement therewith from inoperative to operative positions prior to the energization of the selected group of said devices, connections between each of the latter devices and one of said interposers for maintaining the latter in operative position upon energization of said device, and means to thereupon activate the operative interposers to move their respective printing elements to print position.

5. In a printing machine, a plurality of printing elements grouped to form different characters and selectively operable in various combinations each capable of printing one of said characters, an electromagnetic device individual to each of said elements and selectively operable in groups to identify by their energization the combinations of printing elements required to print said characters, means to selectively energize a group of said devices, an oscillatory bail, a plurality of interposers connected to said printing elements and operated by said bail for movement therewith from inoperative to operative positions prior to the energization of the selected group of said devices, connections between each of the latter devices and one of said interposers for maintaining the latter in operative position upon energization of said device, means to thereupon activate the operative interposers to move their respective printing elements to print position, and means connected to each interposer and cooperating with the last named means to restore the operated printing elements to non-print position.

6. In a printing machine, a plurality of printing elements grouped to form different characters and selectively operable in various combinations each capable of printing one of said characters, an electromagnetic device individual to and cooperating with each of said elements and selectively operable in groups to identify by their energization the combinations of printing elements required to print said characters, means to selectively energize a group of said devices, an oscillatory bail, a plurality of interposers connected to said printing elements and operated by said bail for movement therewith from inoperative to operative positions prior to the energization of the selected group of said devices, connections between each of the latter devices and one of said interposers for maintaining the latter in operative position upon energization of said devices, restoring members for said interposers, and an actuating member initially engageable with those interposers held in operative position to move their respective printing elements to print position and subsequently engageable with said restoring members to return said printing elements to non-print position.

7. In a printing machine, a plurality of printing elements grouped to form different characters and selectively operable in various combinations each capable of printing one of said characters, an electromagnetic device individual to and cooperating with each of said elements and selectively operable in groups to identify by their energization the combinations of printing elements required to print said characters, means to selectively energize a group of said devices, an oscillatory bail, a plurality of interposers connected to said printing elements and operated by said bail for movement therewith from inoperative to operative positions prior to the energization of the selected group of said devices, connections between each of the latter devices and one of said interposers for maintaining the latter in operative position upon energization of said devices, restoring members for said interposers, and an actuating member initially engageable with those interposers held in operative position to move their respective printing elements to print position and subsequently engageable with said restoring members to return said printing elements to non-print position, said actuating member thereafter being engageable with said interposers to restore them to inoperative position.

8. In a printing machine, a plurality of print units arranged in two groups with the units of each group disposed in superposed relation and offset laterally with respect to each other, a print panel for each unit extending upwardly therefrom with all said panels in abutting relation and disposed between said groups of print units and being progressively shorter in length from the bottom to the top units, a multiplicity of printing elements in each panel constituting at least one print head and grouped to form different characters and selectively operable in various combinations each capable of printing one of said characters, means to select a combination of printing elements to be moved to print position, actuating means in each print unit for the selected combination of printing elements of the respective panels and movable to operative and inoperative positions relative to the associated printing elements, means in each print unit for operating said actuating means when in operative position to move the selected printing elements in the associated panel to printing position, and means connected to the various operating means of the different print units for operating the actuating means therein simultaneously.

9. In a printing machine, a plurality of printing elements selectable in various combinations each capable of printing a different character and movable between non-print and print positions, members each having a normal position and connected to a respective one of said elements for primary movement relative to and secondary movement with the connected element, means common to said members for primarily moving all of them, means for returning primarily moved members to normal position, devices selectively operable to delay momentarily the return to normal of respective ones of said members, means to selectively operate said devices, and means operable during said momentary delay to impart the secondary movement to the delayed members to thereby move to one position the printing elements connected thereto.

10. In a printing machine, a plurality of printing elements selectable in various combinations for movement from non-print to print positions to form different characters, actuating members for said printing elements each connected to one of them and movable to and from operative position, means selectively operable in accordance with one of said combinations to momentarily retain a group of said actuating members in operative position, means to return to inoperative position the non-selected actuating members, and two continuously rotating members successively coacting with said actuating members for operating the retained group thereof to move the printing elements connected thereto to print position and to then restore the latter elements to non-print position.

11. In a printing machine, a plurality of print heads in line, each head comprising a multiplicity of selectively operable printing elements, a series of contiguously arranged print panels of progressively differing length each supporting a plurality of said printing heads on one end and the printing elements therein, a plurality of means in each panel cooperating with respective ones of the printing elements of said panel for effecting printing movement thereof and extending to substantially the opposite end of said panel, a print control unit for each panel extending transversely from the latter end thereof, a plurality of selectively operable actuating devices in each unit cooperating with respective ones of said means in the associated panel for selectively operating the printing elements of said panel, and means in each unit to selectively operate the actuating devices therein.

12. In a printing machine, a group of movable printing elements assembled to form a print head and selectively movable to print positions in various combinations to form different characters, a panel in which said printing elements are guided in their movements, said panel comprising spaced supporting rods, a plurality of guide members extending between said supporting rods and having means for removably mounting the same thereon, said guide members further having openings through which said printing elements extend for guidance thereby, spacing elements on said rods between each adjacent pair of guide members, a print control unit upon which said rods are mounted, and means in said unit for selectively moving said printing elements to print positions.

13. In a printing machine, a plurality of print units arranged in two opposed groups with the units of each group in superposed relation and offset laterally with respect to each other to form a progressively increasing space between the inner opposed ends of said units extending from one end of said groups, a print panel for each unit extending from the inner end thereof with all said units disposed in said space in abutting relation, a multiplicity of printing elements in each panel constituting at least one print head and adapted to form different characters by a selective actuation thereof in various combinations each capable of printing one of said characters, means to select a combination of printing elements to be activated, and means in each print unit to activate the selected combination of printing elements in the panel of said unit to print the character identified by said combination.

14. In the printing machine, a plurality of printing elements movable from non-print position to print position and reversely and selectable in various combinations each combination being capable of printing a different character, an actuating member individual to each of said printing elements, a plurality of electromagnetic devices each individual to and cooperating with one of said actuating members and selectively energizable to select the actuating members of the combinations of printing elements required to print said characters, means operable to energize said devices to select said actuating members, and mechanical means operable after energization of said electromagnetic devices to act upon the selected actuating members to positively move said combinations of printing elements to print position, and subsequently positively move them from print position.

15. In a recording machine, a plurality of recording elements grouped to form different data-representations and selectively operable in various combinations each capable of producing one of said data-representations, an electromagnetic device individual to and cooperating with each of said elements and selectively operable in groups to identify by their energization the combination of elements required to form said data-representations, means to selectively energize a group of said devices, interposers for each of said recording elements, means to move said interposers from inoperative to operative positions prior to the energization of the selected group of said electromagnetic devices, connections between each of the latter devices and one of said interposers for maintaining the latter in operative position upon energization of the selected group of electromagnetic devices, and means to thereupon operate said interposers to move their respective recording elements to recording position.

16. In a recording machine, a plurality of recording elements grouped to form different data representations and selectively operable in various combinations each capable of producing one of said data representations, an electromagnetic device individual to each of said elements and selectively energizable to identify by their energization the recording elements required to produce selected ones of said data representations, means to selectively energize said devices, an interposer for each of said recording elements, means to move said interposers from inoperative to operative positions prior to the energization of the selected electromagnetic devices, connections between the latter devices and respective ones of said interposers for maintaining the selected interposers in operative position upon energization of the respective electromagnetic devices, and means initially engageable with said selected interposers to move their respective recording elements to produce the selected data representation and subsequently engageable with said selected interposers to return the latter to inoperative position.

17. In a recording machine, a plurality of recording units arranged in superposed relation, a plurality of panels one for each unit arranged in abutting relation, a multiplicity of recording elements in each panel constituting at least one recording head and grouped to form different data representations and selectively operable in various combinations each capable of forming one of said data representations, means to select a combination of recording elements to be moved to recording position, actuating means in each unit for actuating the selected combination of recording elements in the respective panels and movable to operative and inoperative positions relative to the associated recording elements, means in each unit for operating said actuating means when in operative position to move the selected recording elements in the associated panel to recording position, and means connected to the various operating means of the different units for operating the actuating means therein simultaneously.

18. In a recording machine, a plurality of recording elements selectable in various combinations each capable of producing a different data representation, and movable between non-recording and recording positions, members connected individually to respective ones of said recording elements and each having a primary movement relative to and a secondary movement with the connected recording element between said positions, means to primarily move all of said members, means to select the members connected to the recording elements of a selected one of said combinations, means to retain the thus selected members in the position to which they have been primarily moved, means to restore the non-retained ones of said members, and means to them impart the secondary movement to the retained members to thereby move the recording elements connected thereto to recording position.

19. In a recording machine, a plurality of recording elements selectable in various combinations for operation to produce different data representations, actuating members for said recording elements each connected to one of them and movable to and from operative position, means selectively operable to momentarily retain selected actuating members in operative position, means to return to inoperative position the non-selected actuating members, and means to then operate said retained actuating members to move their respective recording elements to produce the selected data representation.

20. In a recording machine, a plurality of recording elements selectable in various combinations for movement from non-recording to recording positions to produce different data representations, actuating members for said recording elements each connected to one of them and movable to and from operative position, means selectively operable to momentarily retain selected actuating members in operative position, means to return to inoperative position the non-selected actuating members, and means common to said actuating members and coacting therewith for initially operating the retained actuating member to propel the recording elements connected thereto to recording position and for thereafter restoring the latter elements to non-recording position.

21. In a recording machine, a plurality of recording elements selectable in various combinations for movement from non-recording to recording positions to form different data representations, actuating members for said recording elements each connected to one of them and movable to and from operative position, means selectively operable in accordance with one of said combinations to momentarily retain a group of said actuating members in operative position, means to return to inoperative position the non-selected actuating members, and rotating means successively coacting with said actuating members for initially operating the retained group thereof to move the recording elements connected thereto to recording position and to then restore the latter elements to non-recording position.

22. In a recording machine, a group of recording elements movable to form different portions of data representations and each selectable in various combinations with others of said group for forming various data representations, a group of devices individually cooperating with respective ones of said recording elements and selectively activatable to identify by their activation the combinations of recording elements required to form selected data representations, means to selectively activate various combinations of said devices, normally ineffective actuators for said recording elements associated with said devices and selectively rendered effective by the selective activation of said devices, and means to operate the effective actuators to move to recording position the combinations of recording elements identified by the activated devices.

23. A machine according to claim 20, wherein said common operating means for said actuating members is an impact device arranged to strike the retained actuating members initially to drive them and the connected recording elements by impact to recording position and to subsequently strike the same actuating members to return them and the connected recording elements by impact to their non-recording position.

References Cited in the file of this patent

UNITED STATES PATENTS

| Number | Name | Date |
|---|---|---|
| 1,028,037 | Lilleberg | May 28, 1912 |
| 1,608,145 | Tingley | Nov. 23, 1926 |
| 1,831,359 | Lasker | Nov. 10, 1931 |
| 1,834,629 | McArdle | Dec. 1, 1931 |
| 1,957,167 | Hoffman | May 1, 1934 |
| 2,019,442 | Buhler | Oct. 29, 1935 |
| 2,089,447 | Sundstrand | Aug. 10, 1937 |
| 2,111,057 | Swanson | Mar. 15, 1938 |
| 2,129,065 | Loop | Sept. 6, 1938 |
| 2,334,534 | Ballweg | Nov. 16, 1943 |
| 2,353,083 | Roth | July 4, 1944 |
| 2,398,036 | Paris | Apr. 9, 1946 |
| 2,478,275 | Johnson | Aug. 9, 1949 |
| 2,486,985 | Ruderfer | Nov. 1, 1949 |
| 2,524,127 | Johnson | Oct. 3, 1950 |
| 2,554,707 | Johnson | May 29, 1951 |

FOREIGN PATENTS

| Number | Country | Date |
|---|---|---|
| 523,698 | Germany | Aug. 21, 1933 |